United States Patent
Rothstein et al.

(10) Patent No.: US 7,643,027 B2
(45) Date of Patent: Jan. 5, 2010

(54) IMPLICIT FEATURE RECOGNITION FOR A SOLID MODELING SYSTEM

(75) Inventors: Saul J. Rothstein, Holliston, MA (US); Robert M. Siegel, Lexington, MA (US); Ricardo W. Chin, Shrewsbury, MA (US); Mark G. Gibson, Arlington, MA (US)

(73) Assignee: Dassault Systemes SolidWorks Corporation, Concord, MA (US)

( * ) Notice: Subject to any disclaimer, the term of this patent is extended or adjusted under 35 U.S.C. 154(b) by 340 days.

(21) Appl. No.: 11/624,439

(22) Filed: Jan. 18, 2007

(65) Prior Publication Data

US 2008/0174599 A1 Jul. 24, 2008

(51) Int. Cl.
*G06T 15/00* (2006.01)
(52) U.S. Cl. ............... 345/420; 345/441; 345/676; 703/2; 703/6; 703/7; 717/108; 717/143; 700/98
(58) Field of Classification Search .......... 345/420, 345/441, 442, 676, 677, 678; 703/2, 6, 7; 717/108, 143; 700/98
See application file for complete search history.

(56) References Cited

U.S. PATENT DOCUMENTS 6,768,928 B1* 7/2004 Nagasawa et al. ............ 700/98
6,877,156 B2* 4/2005 Osborne et al. ............ 717/143
7,054,885 B1* 5/2006 Hoffman et al. ......... 707/103 Y
7,295,958 B1* 11/2007 Suh et al. .................... 703/7
2002/0008700 A1 1/2002 Fuki

FOREIGN PATENT DOCUMENTS

EP 1 302 904 A 4/2003
EP 1 501 026 A 1/2005

OTHER PUBLICATIONS

Allada, v., et al. "Feature-Based Modelling Approaches for Integrated Manufacturing: State-of-the-Art Survey and Future Research Directions," *International Journal of Computer Integrated Manufacturing*, 8(6): 411-440 (1995).

Narang, R. V. "An Application-Independent Methodology of Feature Recognition with Explicit Representation of Feature Interaction," *Journal of Intelligent Manufacturing*, 7(6): 479-486 (1996).

(Continued)

*Primary Examiner*—Phu K Nguyen
(74) *Attorney, Agent, or Firm*—Hamilton, Brook, Smith & Reynolds, P.C.

(57) ABSTRACT

Creating an explicit feature used for construction of a computer-aided design model includes recognizing that model features form an implicit feature, presenting variations of the implicit feature, selecting one of the variations of the implicit feature, and creating the explicit feature. The explicit feature produces geometry that gives rise to the selected variation of the implicit feature. The computer-aided design model is constructed by generating the explicit feature after generating the model features that form the implicit feature.

21 Claims, 9 Drawing Sheets

OTHER PUBLICATIONS

Sakurai, H., et al. "Shape Feature Recognition from 3D Solid Models," *Computers in Engineering. Proceedings of the ASME International Computers in Engineering Conference and Exposition*, 1: 515-519 (1988).

Salomons, O.W., et al. "Review of Research in Feature-Based Design," *Journal of Manufacturing Systems*, 12(2): 113-132 (1992).

Su, C.-J., et al. "An Integrated Form-Feature-Based Design System for Manufacturing," *Journal of Intelligent Manufacturing*, 6(5): 277-290 (1995).

Wilson, P. R., et al. "A Taxonomy of Form Features for Solid Modeling," *Geometric Modeling for CAD Applications*, 125-135 (1988).

* cited by examiner

IMPLICIT FEATURE RECOGNITION FOR A SOLID MODELING SYSTEM

FIELD

This application relates to Computer-Aided Design (CAD), and more particularly, to the recognition of implicit features and the creation of explicit features in 3D feature-based CAD modeling systems.

BACKGROUND OF THE INVENTION

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. CAD systems may combine solid modeling and other modeling techniques, such as parametric modeling techniques. Parametric modeling techniques can be used to define various parameters for different features and components of a model, and to define relationships between those features and components based on relationships between the various parameters.

A design engineer is a typical user of a 3D CAD system. The design engineer designs physical and aesthetic aspects of 3D models, and is skilled in 3D modeling techniques. The design engineer creates parts and may assemble the parts into a subassembly. Parts and subassemblies may be used to design an assembly.

A solid modeling system may be a feature-based 3D CAD system whereby a part is constructed using various features. Examples of features include bosses, fillets, and chamfers. A boss may be constructed by first creating a two-dimensional profile and extruding that profile into a three-dimensional object. A fillet may be created by rounding an edge in the concave or convex direction. A chamfer may result from cutting an edge or a corner at an angle. Other features commonly constructed using solid modeling systems are cuts, holes, shells, lofts, sweeps, and weld treatments (which are particularly useful in machine design).

The physical structure of a part constructed using a feature-based 3D CAD system is often dependent upon the order in which a design engineer creates the features. For example, a corner fillet takes on a different appearance depending on which of the three edges forming the corner was created first.

Generally, in a feature-based CAD system, a feature acts on all features that have been previously included in the part and has no effect on features subsequently introduced to the part. Thus, a feature-based modeling system may also be a history-based modeling system where the order in which each feature is generated is dependent on historical order. Commercially available feature-based modeling systems include the Solid-Works® 2007 software system available from SolidWorks Corporation of Concord, Mass.

Often the design engineer discovers that the feature order results in the generation of a physically incorrect part. The design engineer is then burdened with deleting and re-creating portions of the part or the entire part, re-ordering the features that constitute the part by manipulating one or more feature locations in the overall historical order of features, or in some other manner, which may be tedious, correcting the inaccurate geometry. The design engineer may be required to spend an enormous amount of time and effort during the 3D modeling process controlling the feature order and the feature order's affect on the final geometric representation of a part.

Moreover, while building a part, the order in which a design engineer should introduce features and direct the system to perform operations is not always intuitive. Many times the design engineer has invested a great deal of time designing a part before discovering that the features should be introduced in a different order. When the design engineer realizes that the feature ordering did not achieve the desired result (e.g., the desired geometric result), he or she must modify the definition of the part, for example, by rearranging the hierarchical structure of the part.

Due to the problem of introducing features in a particular order, modeling a part may require a great deal of planning and expertise. The design engineer must determine the correct ordering of features before creating the features to obtain the desired geometric result. The ordering problem is present throughout the modeling process. For example, features introduced latter in the design process may affect features that do not share common boundaries, due to parametric relationships or other interrelationships. The difficulty of the ordering problem may increase as the modeling process progresses because as a part becomes more complex, the design engineer has more difficulty determining the correct feature order. Although, a CAD system may provide a feature management tool to help a design engineer rearrange the history of features included in a part, the design engineer is generally encumbered with analyzing the feature history and re-ordering the features in the part hierarchy as necessary to ensure that the part is geometrically correct. Moreover, features are connected to each other in complex ways and real-world parts have multiple features. Having the ability to change the sequence in which features are generated does not address the problem of propagating incorrect geometry. For example, re-ordering fillets to correct the geometry of one corner may cause the geometry in a second corner positioned at the opposite end of one or more of the re-ordered fillets to become incorrect.

Time-saving advantages and enhancements to state of the art CAD systems could be achieved by providing an efficient means of recognizing interrelationships between features and allowing physical characteristics of the interrelated features or portions thereof to behave independently of other features without regard to the order in which the interrelated features were defined.

SUMMARY OF THE INVENTION

In general, in one aspect, the invention features a computer-implemented method for creating an explicit feature used to construct a computer-aided design model by recognizing that various features of the model form an implicit feature, presenting variations of the implicit feature, selecting one variation of the implicit feature, and creating the explicit feature, which produces geometry giving rise to the selected variation of the implicit feature. Constructing the model includes applying the explicit feature after applying the various features.

Implementations may include each one of the various features being a fillet feature and the position of the implicit feature being in a corner where the various features converge. Implementations may also include various features that are a weldment treatment, a chamfer, a sweep, or a loft.

Some implementations may also include removing an area in the model that encompasses geometry produced by the various features and replacing that area in the model with geometry giving rise to the selected implicit feature variation.

Additionally, the area removed may be determined by creating a solid body that conforms to geometry produced by the various features and the solid body may be centered at a location within the plurality of features. Furthermore, a shell operation may be applied to the computer-aided design model prior to removing the area.

Replacing the area with the geometry giving rise to the selected implicit feature variation may include sewing the geometry giving rise to the selected implicit feature variation into the area removed and smoothing a discernable seam resulting from sewing.

Methods may also include generating geometry for each implicit feature variation on a copy of the model and removing the copy corresponding to the selected implicit feature variation in a region surrounding the generated geometry.

Moreover, implementations include creating a copy of the model and re-ordering the various features in the copy. Re-ordering changes an order of construction for the various features in the copy thereby producing one of the implicit feature variations.

Other aspects of the invention include presenting each implicit feature variation as a preview image within a user-interface window, applying a six-sided body to remove the area that surrounds the geometry giving rise to the implicit feature, and applying the six-sided body using a Boolean intersection operation.

The details of one or more embodiments of the invention are set forth in the accompanying drawings and the description that follows. Other features, objects, and advantages of the invention will be apparent from the description and drawings, and from the claims.

DETAILED DESCRIPTION OF THE INVENTION

The present invention recognizes that a collection of features that are positionally interrelated form an implicit feature, creates a new feature to replace geometry generated by the collection of features, and gives a user explicit control over the new feature. Hereinafter, the new feature that generates geometry that replaces geometry generated by the collection of features will be referred to as an explicit feature.

Figure 1:
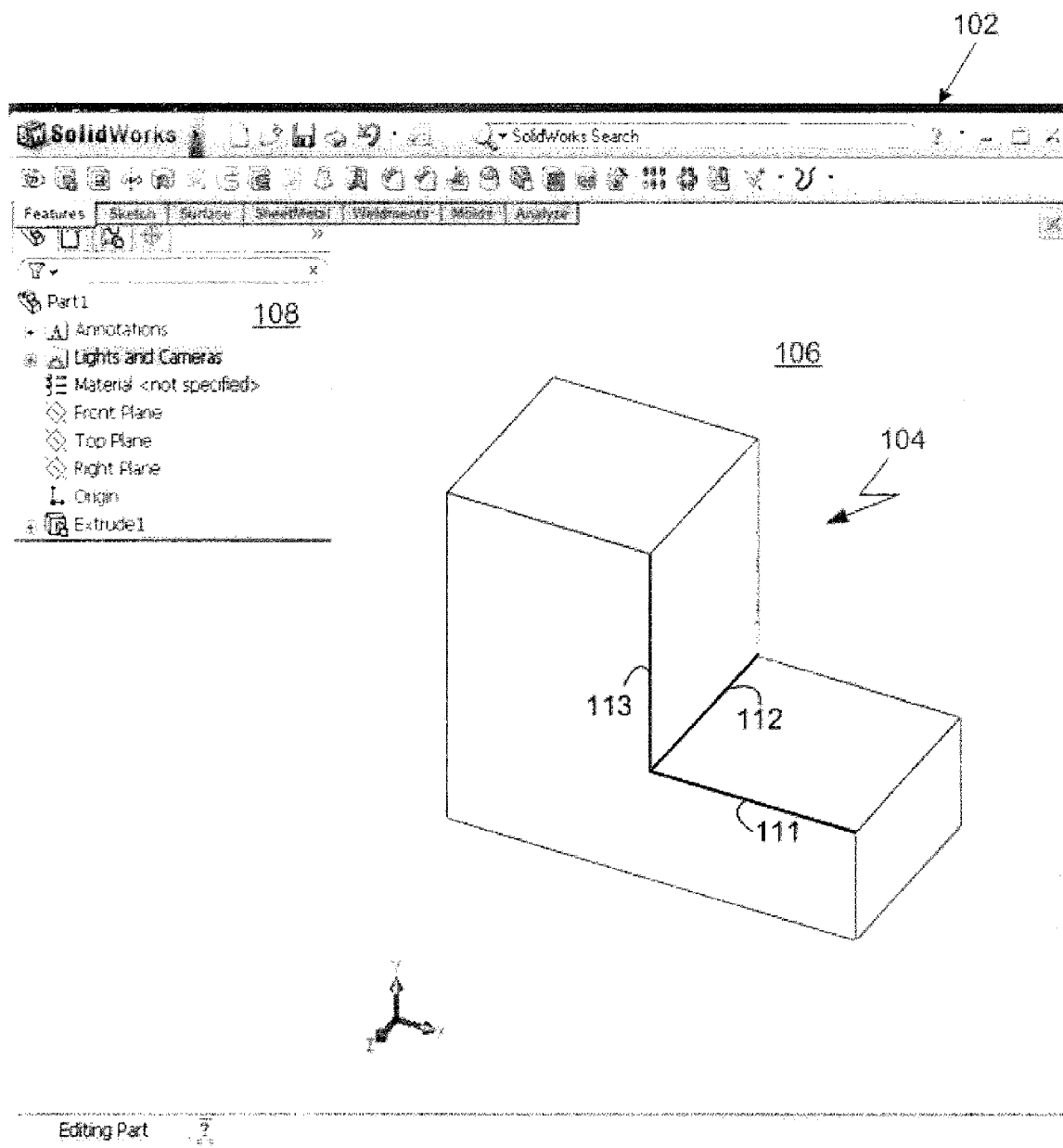
FIG. 1 is an illustration of a computer-generated model and a feature manager portion of the user interface displayed in a window in one embodiment of the present invention.

Referring now to FIG. 1, a window 102 displayed on a computer monitor is shown. The window 102 is generated by modeling software executed by a computerized modeling system, an example of which is later shown with reference to FIG. 9. The window 102 is a conventional computer-generated window that can be programmed by one of ordinary skill in the art using conventional, commercially available, software programming tools, such as those available from Microsoft Corporation of Redmond, Wash.

A computer-generated 3D model 104 is displayed within a modeling portion 106 of the window 102. Three edges of the 3D model 104 that form a corner—a lower outer edge 111, an inner edge 112, and an upper outer edge 113—are highlighted. Implementations also may include other window areas, such as a FeatureManager® window panel 108 in which the structure of a component, an assembly, or a drawing is listed to help the design engineer visualize and manipulate the 3D model 104, as well as components of the 3D model 104. The FeatureManager window panel 108 presents the feature history to the design engineer as a hierarchical collection of features. The design engineer may be able to rearrange the collection of features by dragging or otherwise moving a depiction of a feature to a different position in the hierarchical collection, and thereby modify the feature history for a part. U.S. Pat. No. 5,815,154 to Hirschtick et al discloses a system for modifying a model by allowing a user to graphically manipulate a hierarchical collection of features.

Figure 2:
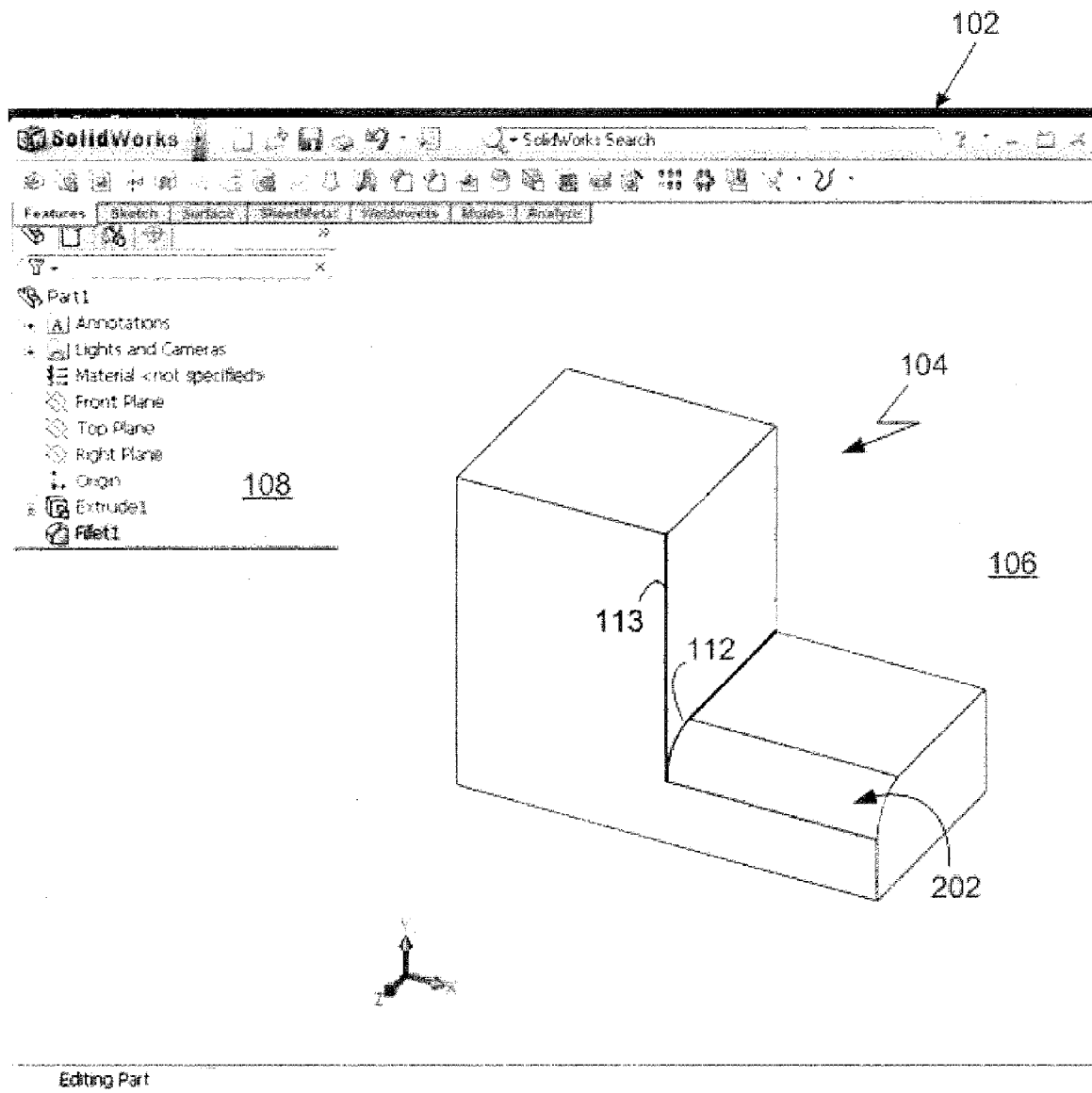
FIG. 2 is an illustration of the computer-generated model of FIG. 1 having one filleted edge creating a first fillet feature.
Figure 3:
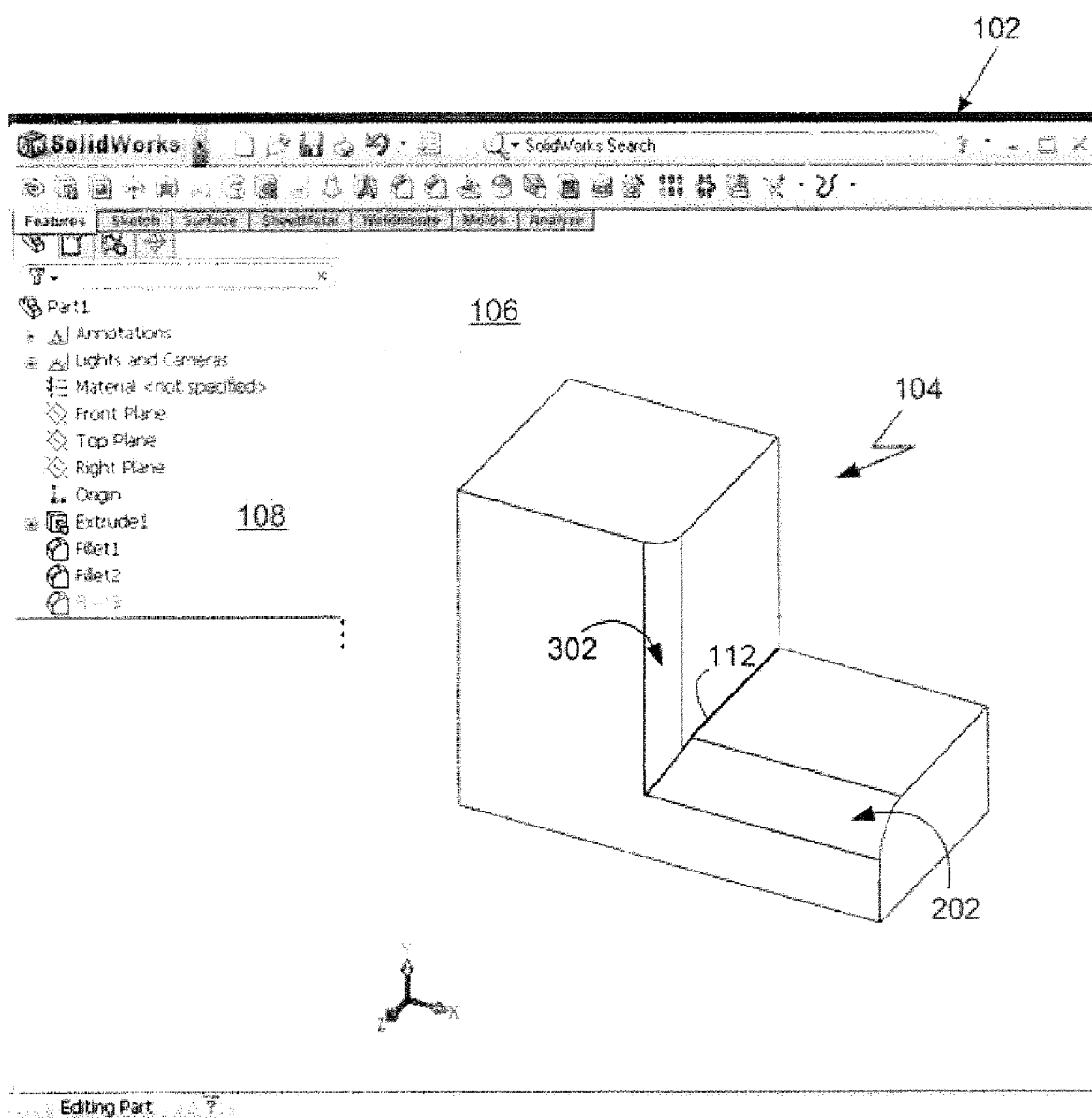
FIG. 3 is an illustration of the computer-generated model having a second fillet feature
Figure 4:
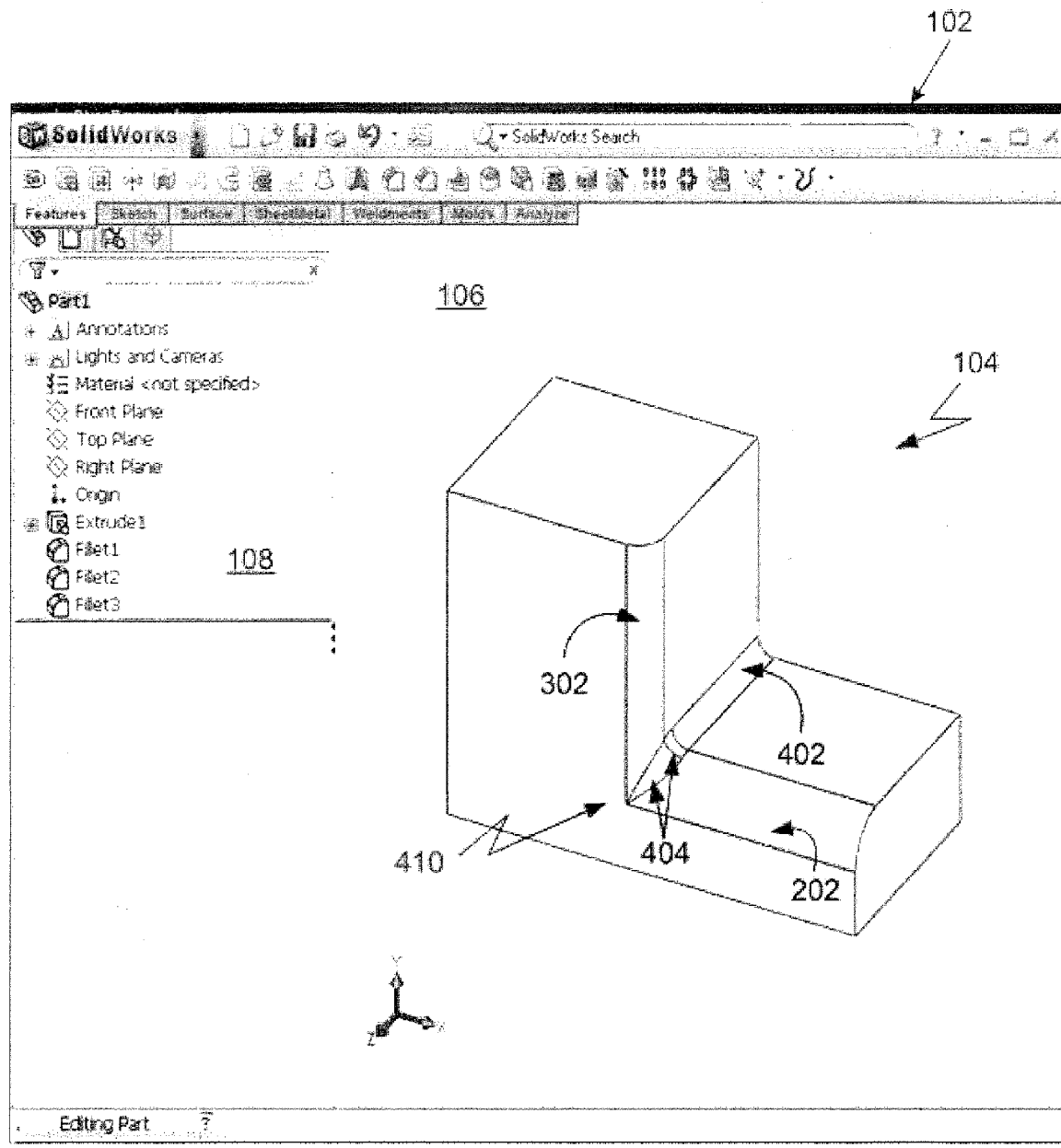
FIG. 4 is an illustration of the computer-generated model having a third fillet feature

Referring now to FIG. 2, the lower outer edge 111 of the model 104 (shown in FIG. 1) is filleted, creating a first fillet feature 202. FIG. 3 shows a second fillet feature 302 created by filleting upper outer edge 113 of the model 104, in addition to the filleted outer edge 202. The first fillet feature 202 and the second fillet feature 302 have different size radii, as is apparent by viewing the inner sides of the fillets. As shown in FIG. 4, a third fillet feature 402 is created by filleting inner edge 112. Thus the filleted corner 410 in FIG. 4 is the result when the model software generates the first fillet feature 202 first, the second fillet feature 302 second, and the third fillet feature 402 third. The filleted corner 410 includes two small faces 404 in an area where the first fillet feature 202, the second fillet feature 302, and the third fillet feature 402 meet.

Alternatively, the filleted corner 410 can have a different appearance. In an embodiment, the filleted corner is recognized as an implicit feature either automatically or when prompted by the user. Once the filleted corner 410 is recognized as an implicit feature, a user interface is displayed so that the user can select the appropriate corner, as shown in FIG. 5.

Figure 5:
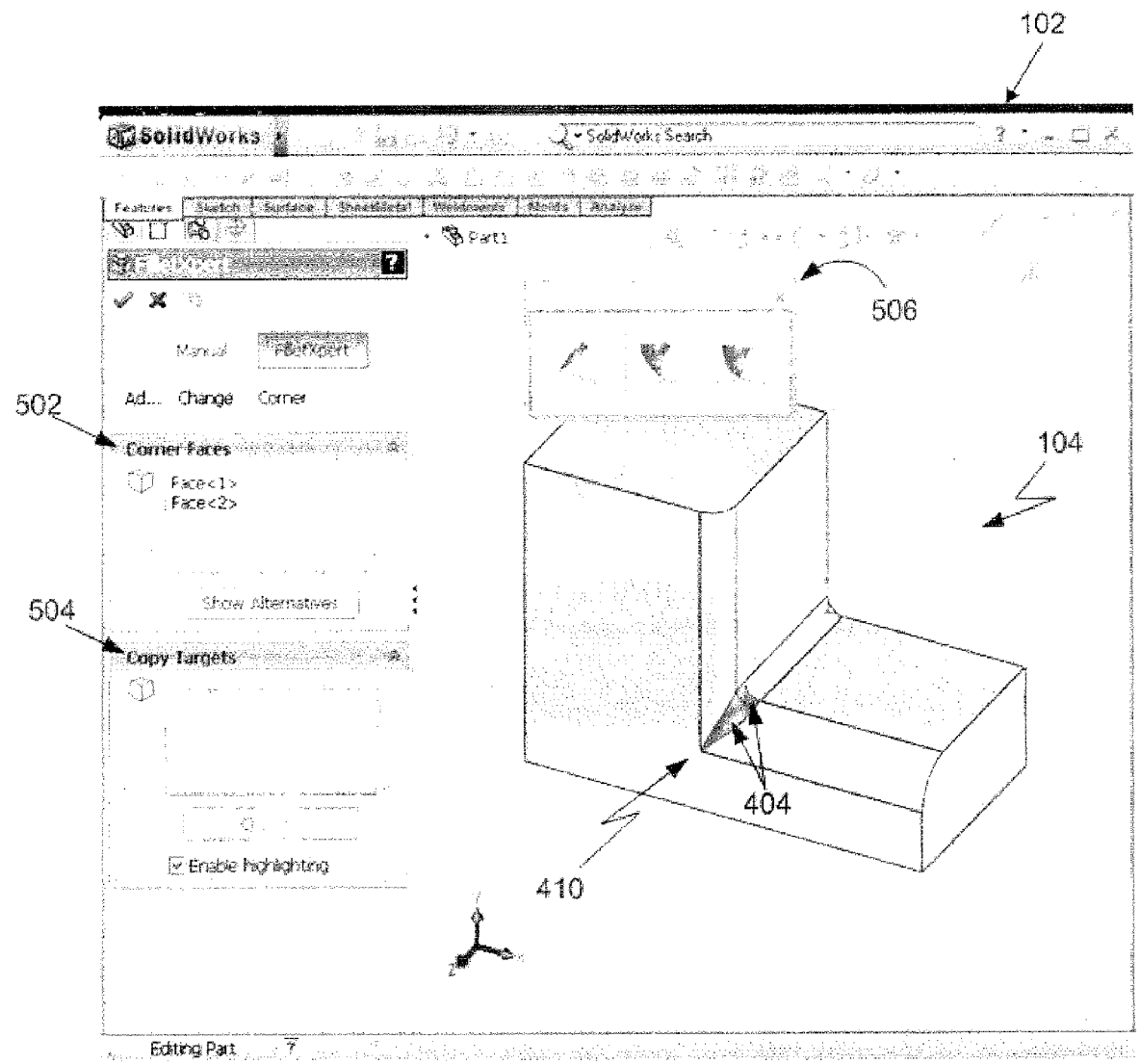
FIG. 5 is an illustration of the invention user interface displayed in a window with the computer generated model of FIG. 4 in which the filleted corner is recognized as an implicit feature.

The user interface in FIG. 5 includes an implicit feature control area 502, which displays the names of the implicit feature's entities. In FIG. 5, the implicit entities are named Face<1> and Face<2> and correspond to the two small faces 404. The implicit entities can be determined automatically or can be selected by the user with an interactive input device such as a mouse. The user interface also includes a copy control area 504, which enables an explicit feature to be reused elsewhere in the model 104 or in another model.

Figure 6:
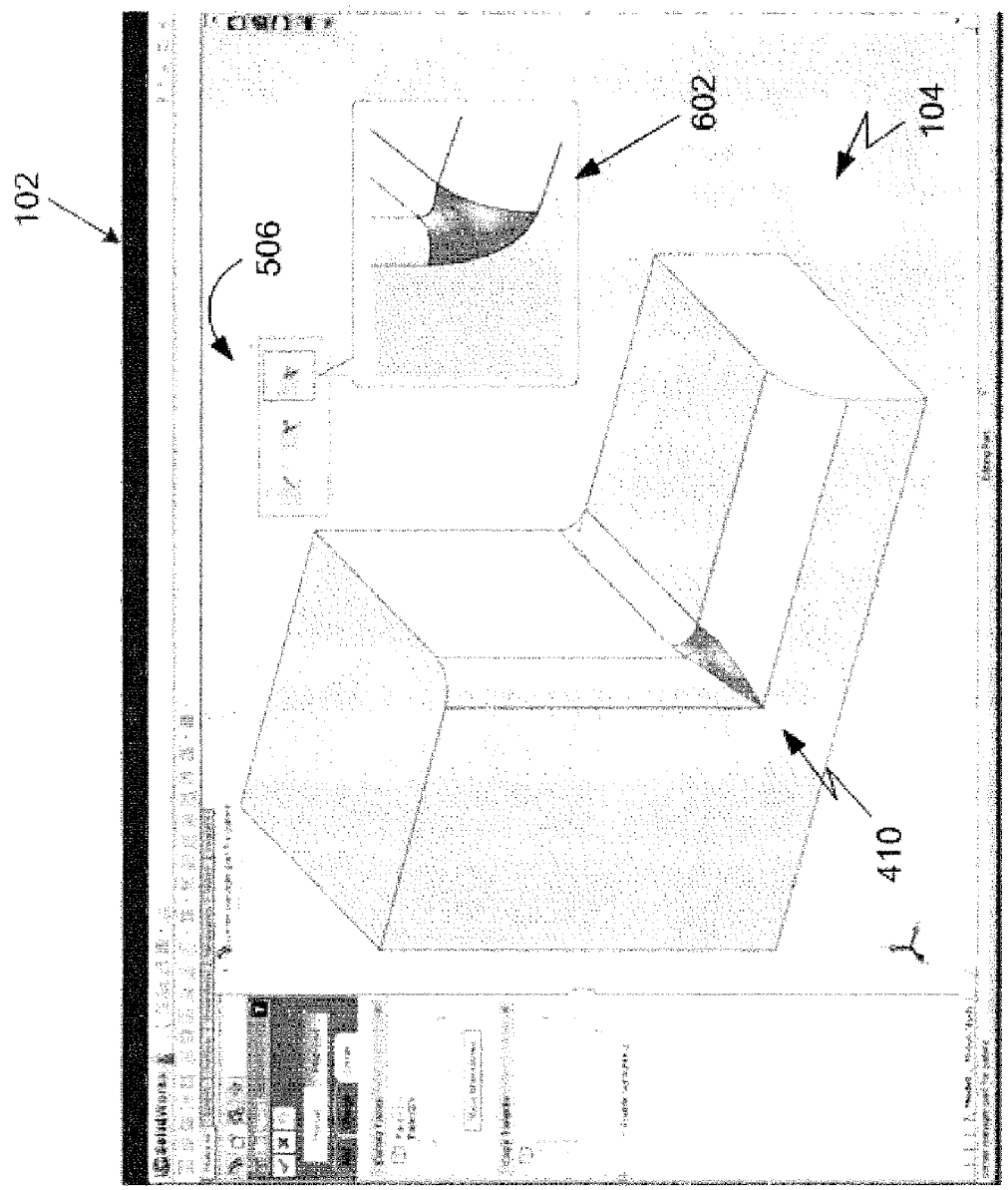
FIG. 6 is an illustration of the user interface of FIG. 5 having an expanded view and a preview of a user selectable alternative construction of the implicit feature.

The user interface in FIG. 5 also includes a selection window 506, which is a small window that contains thumbnail views of alternative constructions of the filleted corner 410 (i.e., the subject implicit feature). The selection window 506 provides a means by which the user can choose the construction of the filleted corner. Referring now to FIG. 6, the user interface may implement a technique that displays an expanded image 602 so the user can more easily see a selection when the cursor points to the selection in the selection window 506. Thus the selection window 506 of FIGS. 5 and 6 provide previews of the possible selections (i.e., alternative constructions of the subject implicit feature).

Figure 7:
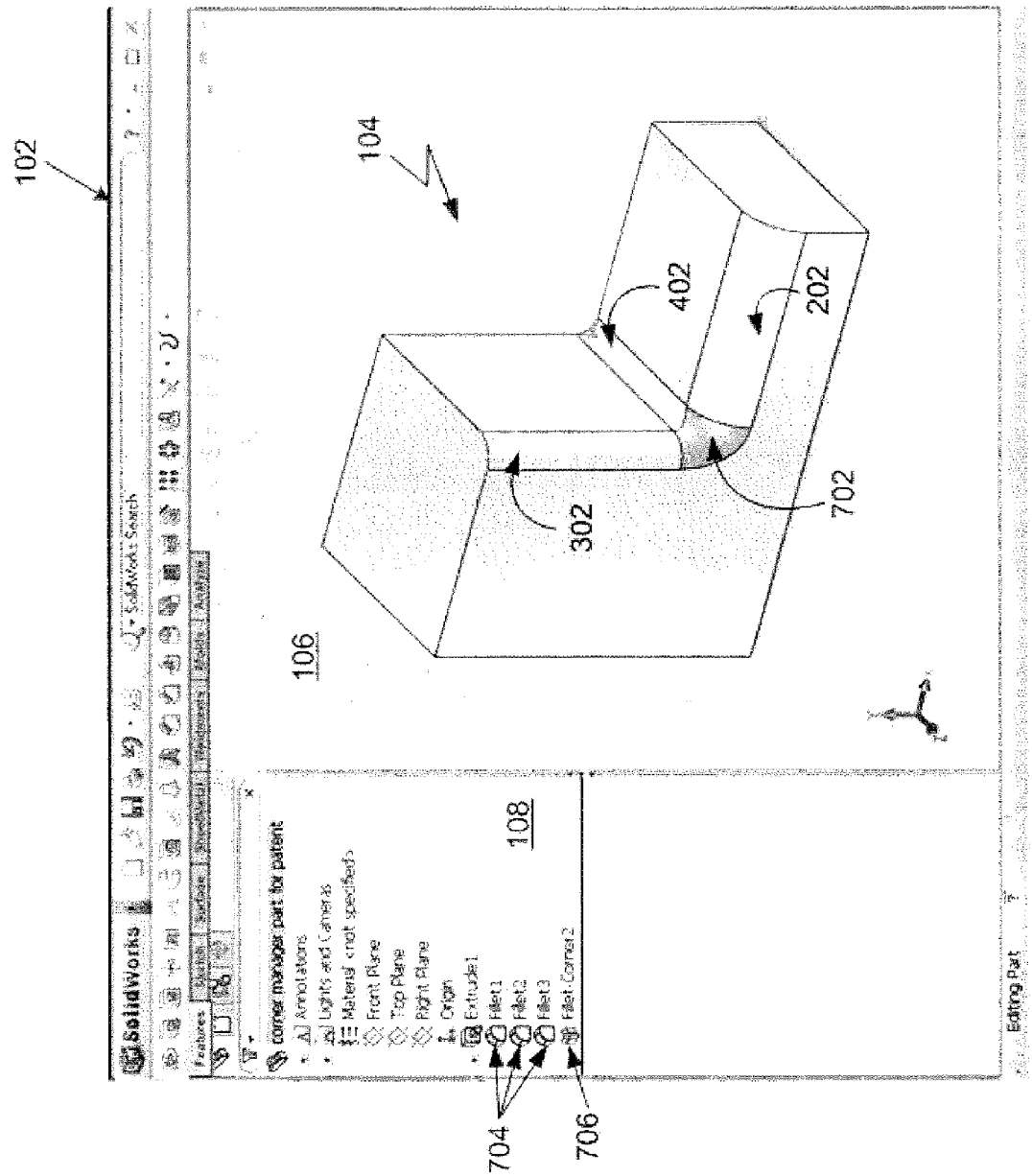
FIG. 7 is an illustration of the computer-generated model and the feature manager of the user interface displayed in a window in which the subject implicit feature is replaced by an explicit feature according to the present invention.

FIG. 7 shows the model 104 after the user selects a construction of the filleted corner and an explicit feature 702 is created, which includes generating geometry that replaces geometry that gives rise to the implicit feature. Geometry generated by the explicit feature 702 and geometry that gives rise to the implicit feature may be shaped differently from one another, and therefore, be of differing sizes. Additionally, the explicit feature is an independent feature type and may be re-used in another area of the model 104 (or another model). The names 704 of the three fillets 202, 302, 402 remain displayed hierarchically in the FeatureManager window panel 108 and the name 706 of the explicit feature 702 is also displayed in hierarchical order in the FeatureManager window panel 108. Thus, the first fillet 202, second fillet 302, third fillet 402, and explicit feature 702 may all be manipulated independently. Moreover, the name 706 of the explicit feature 702 is listed after the names 704 of the three fillets 202, 302, 402 denoting that the explicit feature 702 is generated last.

Figure 8:
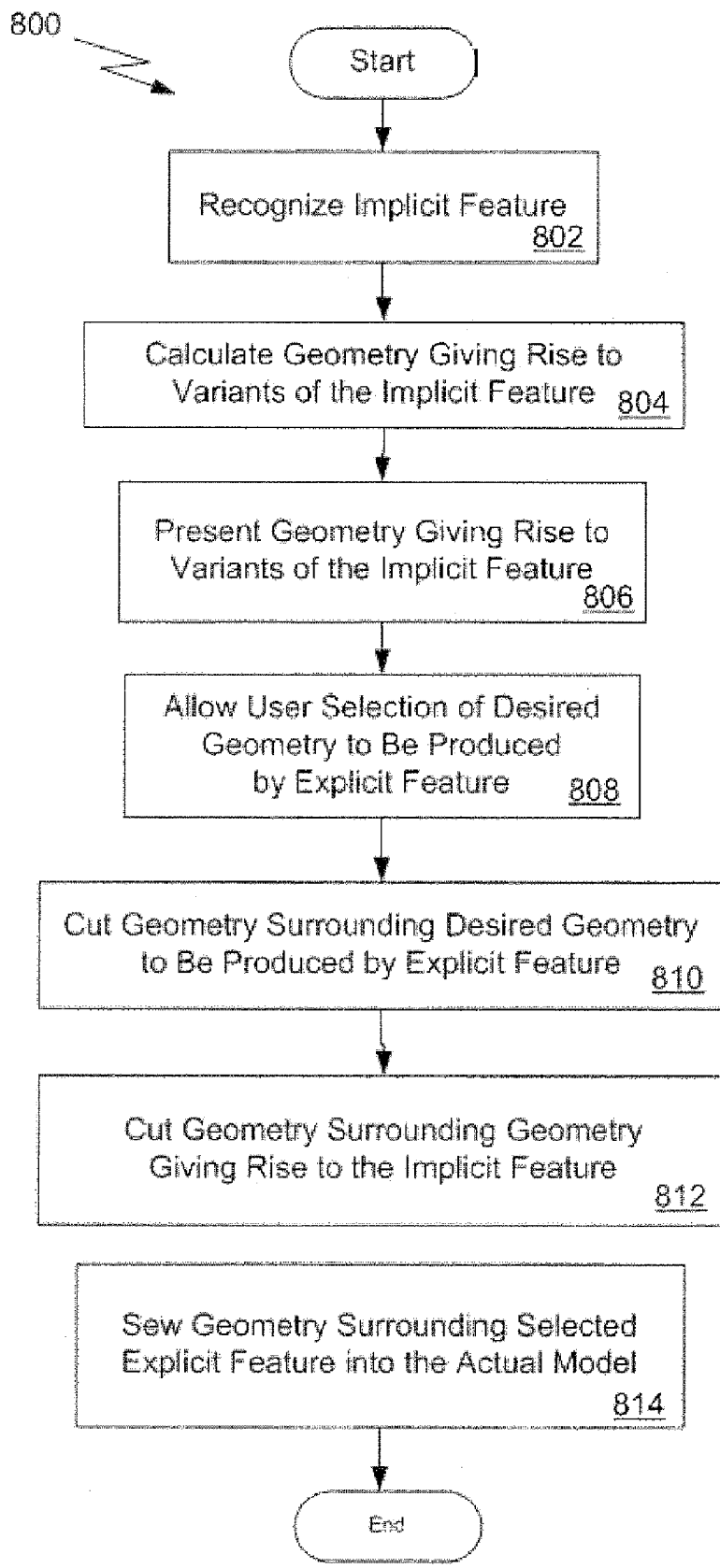
FIG. 8 is a flowchart depicting steps taken by an embodiment of the present invention.

FIG. 8 is a flowchart of a procedure 800 implemented by an embodiment of the present invention. Procedure 800 may begin automatically, for example when all edges of a face are filleted, when all edges that converge at a corner are filleted, or when a chamfered edge meets a filleted edge or other instances when an implicit feature occurs. Alternatively, procedure 800 may begin after a user requests that the modeling system search for an implicit feature.

Procedure 800 first recognizes an implicit feature (step 802). One way in which procedure 800 automatically recognizes an implicit feature is by analyzing a spatial or geometric relationship between features. For example, procedure 800 can automatically recognize that three or more fillets form an implicit feature when the underlying edges of those fillets share a common vertex or when vertices corresponding to the edges are within a pre-defined proximity to one another. Likewise, procedure 800 can automatically recognize that an implicit feature forms in the area surrounding the intersection of weldment treatments. Additionally, procedure 800 can automatically recognize an implicit feature formed when features that are not all the same type have a spatial or geometric relationship that causes different geometric results depending upon the order in which the features are defined. Additionally, procedure 800 can recognize an implicit feature with the aid of the user. The user may select one or more faces and indicate to the system that the faces form an implicit feature. Moreover, the user may identify geometry created by overlapping features and indicate that the overlapping geometry gives rise to an implicit feature.

Once an implicit feature is recognized, all possible variants of the implicit feature are calculated (step 804). One embodiment automatically calculates all possible variants of the implicit feature by re-ordering the collection of features forming the implicit feature in each feasible way to produce different geometric results while maintaining the general user-specified shape. For implicit features formed by fillets, an embodiment can determine the number of variants by analyzing the number, convexity, radii, and other characteristics of the fillets forming the implicit feature. Further, an embodiment may only include certain variants of the implicit feature, such as a variant formed by fillets of mixed convexity.

In general, the variants that are calculated are variants that affect the resulting geometry that gives rise to an implicit feature. Each variant of the implicit feature is computed on a copy of the model in which the features are re-ordered.

The user is then presented with the different geometric results giving rise to the variants of the implicit feature (step 806) and may select one of the presented geometric results (step 808), which will be produced by the explicit feature. As previously discussed, an embodiment may show previews of the geometry produced by variants of the implicit feature using a what-you-see-is-what-you-get (WYSIWYG) approach and allow the user to select one of the previews. The previews display the actual geometry giving rise to each variant of the implicit feature rather than a generic icon, enabling the user to more easily identify and select the correct corner (i.e., the desired geometric result).

Once the user has selected the desired geometric result, geometry of the corresponding copy of the model in the area surrounding the desired geometry result is cut or otherwise removed from the copy of the model (step 810), and geometry of the actual model in the area surrounding the geometry giving rise to the implicit feature is cut/removed from the actual model (step 812). The geometry that is cut/removed from the actual model and cut/removed from the copy encompasses an area that surrounds geometry giving rise to the implicit feature or variation thereof respectively. In the case of a corner, an area containing the geometry that forms the corner is cut/removed from the copy of the model and the actual model.

The area which is cut/removed may be defined using a solid body constructed for the purpose of chopping out a region of the model; this solid body is hereinafter referred to as a chopping body. The chopping body conforms as closely as practicable to the area where the various features meet. The chopping body may be positioned automatically. For example, when the implicit feature is a corner feature, the chopping body may be centered where the edges of a corner converge. The dimensions of the chopping body may be determined automatically and be dependent on the size of one or more of the features in the collection of features. An embodiment may also allow the user to specify the dimensions by enabling the user to adjust the position and size of a wireframe depiction of the chopping body displayed on the model. In an embodiment, the chopping body is applied to a shelled copy of the model containing the selected geometric result and the actual model. Applying the chopping body may be accomplished by a Boolean intersection operation.

Alternatively, a bounding box or a bounding sphere may be used to define the area that is cut/removed and similarly dimensioned; however, a bounding box and a bounding sphere do not accurately cut the model and may cause unwanted nicks and slices in neighboring geometry.

By contrast, a chopping body only cuts/removes the trimmed surfaces immediately adjacent to trimmed surfaces that give rise to the implicit feature and thereby avoids making undesirable nicks in neighboring geometry. In the current implementation, the chopping body is a hexahedron with planar faces. The faces, however, need not be parallel or perpendicular to one another. For a corner feature, the chopping body is based on the direction vectors associated with the edges that converge at the vertex of the corner. If the convergent edges are not orthogonal, the chopping body will not be orthogonal either. The chopping body may be sized based upon the radii of the fillets forming an implicit feature and just large enough to surround the geometry giving rise to implicit feature.

Finally, the geometry cut/removed from the copy of the model containing the selected geometric result is pasted or otherwise placed into the hole left from the cut in the actual model (step 814). A process called "sewing," which is a well-known solid modeling technique for adding geometry to a solid or surface model, may be used to paste/place the geometry. After pasting/placing the geometry cut/removed from the copy of the model into the actual model any discernable seams are smoothed. Additionally, any shell operation is then reversed.

Procedure 800 then ends and the explicit feature is added to the model definition in an order following the definition of the collection of features that formed the implicit feature. The order of the collection of features remains unchanged. Thus, the collection of features is always generated in the order in which the features in the collection were initially defined. Then, the explicit feature is applied by cutting/removing the area surrounding the implicit feature and pasting/placing the geometry that surrounded the selected geometric result. This enables the explicit feature to behave independently and not be susceptible to changes in the model.

In general, the explicit feature maintains the design intent of the user when the model is modified. That is, once the user has chosen a desired result, the present invention may maintain the desired result when a parameter is modified. For example, in an embodiment, a modification to the radius or the feature order of a fillet that contributes to the formation of an implicit feature does not cause the corresponding shape the explicit feature (e.g., triangular or quadrilateral) to change.

Figure 9:
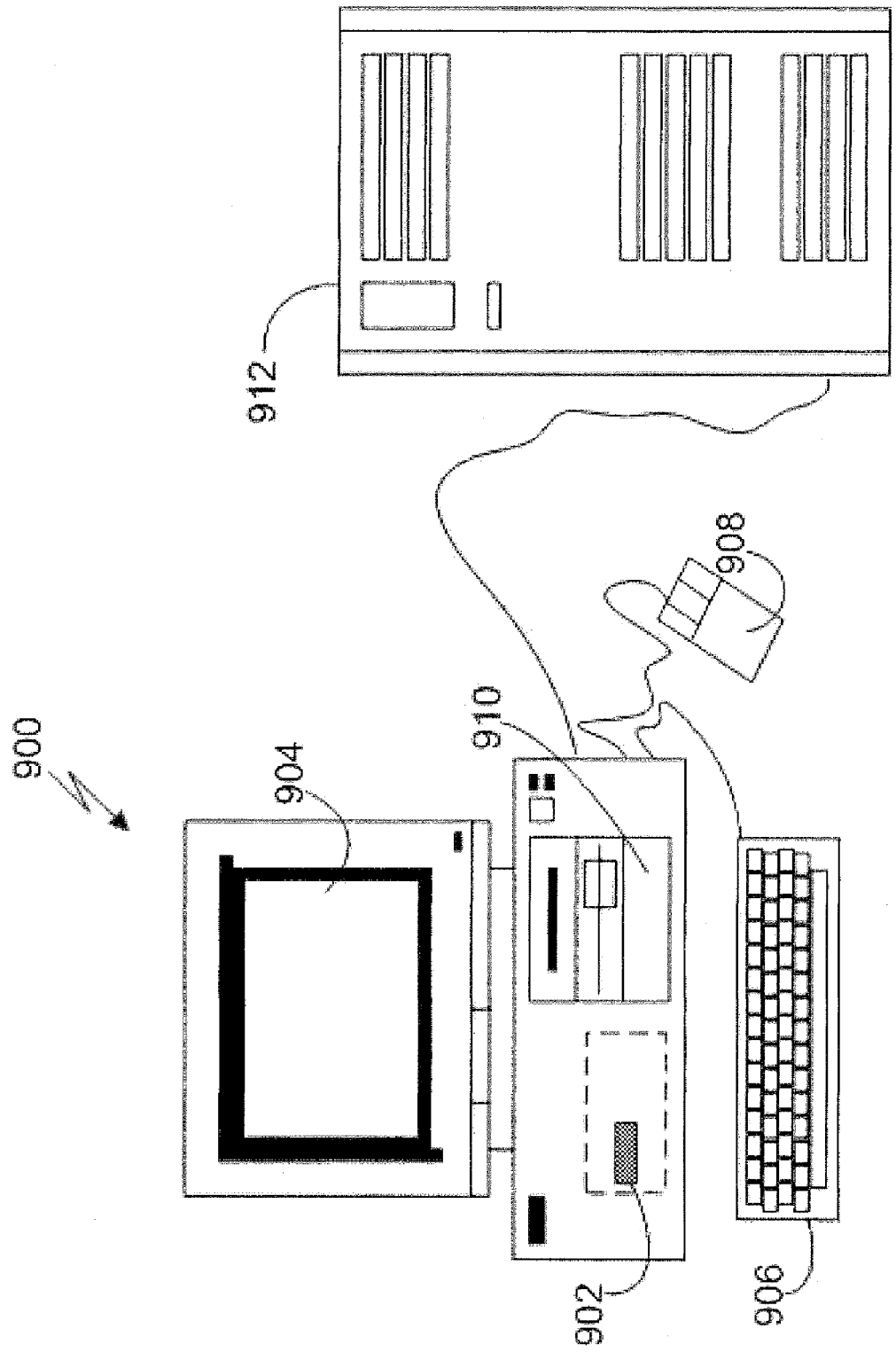
FIG. 9 is a schematic diagram of a computer system in which embodiments of the present invention are implemented.

Referring now to FIG. 9, a computerized modeling system 900 is shown and includes a CPU 902, a computer monitor 904, a keyboard input device 906, a mouse input device 908, and a storage device 910. The CPU 902, computer monitor 904, keyboard 906, mouse 908, and storage device 910 can include commonly available computer hardware devices. For example, the CPU 902 can include a Pentium-based processor. The mouse 908 may have conventional left and right buttons that the user may press to issue a command to a software program being executed by the CPU 902. As an alternative or in addition to the mouse 908, the computerized modeling system 900 can include a pointing device such as a trackball, touch-sensitive pad, or pointing device and buttons built into the keyboard 906. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft Windows NT, Windows 98, Windows 2000, Windows XP, Windows ME, UNIX, Linux, or MAC OS operating systems.

Additional computer processing units and hardware devices (e.g., rapid prototyping, video, and printer devices) may be included in the computerized modeling system 900. Furthermore, the computerized modeling system 900 may include network hardware and software thereby enabling communication to a hardware platform 912, and facilitating communication between numerous computer systems that include a CPU and a storage system, among other computer components.

Computer-aided modeling software of the present invention may be stored on the storage device 910 and loaded into and executed by the CPU 902. The modeling software allows a user to create and modify a 3D model and implements aspects of the invention described herein. The CPU 902 uses the computer monitor 904 to display a 3D model and other aspects thereof as described. Using the keyboard 906 and the mouse 908, the user can enter and modify data associated with the 3D model. The CPU 902 accepts and processes input from the keyboard 906 and mouse 908. The CPU 902 processes the input along with the data associated with the 3D model and makes corresponding and appropriate changes to that which is displayed on the computer monitor 904 as commanded by the modeling software. In one embodiment, the modeling software is based on a solid modeling system that may be used to construct a 3D model consisting of one or more solid and surface bodies.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

An advantage of the present invention is that the present invention allows a user to ignore the order in which a collection of features that form an implicit feature are defined and are generated. As previously discussed, rearranging the feature order may be a tedious and a lengthy process. However, by creating an explicit feature that has physical characteristics that are independent of other features, the present invention solves the problem of requiring the design engineer to manually re-order features to correctly construct the part.

Yet another advantage of the present invention is that explicit features are not susceptible to the reordering of neighboring fillets because explicit features behave independently of other features. For example, the present invention detaches the construction of a desired corner shape from constraints imposed by the shapes of neighboring corners.

Other advantages include the ability to readily re-use an explicit feature by applying the explicit feature to other areas of a model or to another model. A user may identify a similar implicit feature and replace the geometry surrounding the similar implicit feature with an explicit feature. For example, an explicit feature in one corner of a model may be reused in another corner of the model.

Yet another advantage is that explicit features exists as new, separate, feature types rather than including a property that applies to one or more fillets that converge at a corner, or as a property that defines the entire collection of features at once such as all fillets that surround a corner.

A number of embodiments of the present invention have been described. Nevertheless, it will be understood that various modifications may be made without departing from the spirit and scope of the invention. For example, implementations may change the order in which operations are performed. Furthermore, depending on the needs of an implementation, particular operations described herein may be implemented as a combined operation, eliminated, added to, or otherwise rearranged. Additionally, an embodiment described herein discusses how feature order influences geometry that gives rise to implicit features. As previously mentioned, geometry created by overlapping features may be considered a form of an implicit feature, and the fact that the features overlap may be independent of feature order. In addition, the types of features that intersect can influence geometry that gives rise to an implicit feature independent of the feature order.

Accordingly, other embodiments are within the scope of the following claims.

While this invention has been particularly shown and described with references to example embodiments thereof it will be understood by those skilled in the art that various changes in form and details may be made therein without departing from the scope of the invention encompassed by the appended claims.

What is claimed is:

1. A computer-implemented method for creating an explicit feature used for construction of a computer-aided design model, the method comprising:
   recognizing that a plurality of features of the computer-aided design model form an implicit feature, the implicit feature being defined implicitly in terms of existing external features;
   presenting variations of the implicit feature;
   selecting one of the variations of the implicit feature;
   creating the explicit feature, wherein the explicit feature produces geometry giving rise to the selected one of the variations of the implicit feature; and
   constructing the computer-aided design model by generating the explicit feature after generating the plurality of features.

2. The computer-implemented method of claim 1, wherein:
   each one of the plurality of features is a fillet feature; and
   the implicit feature is positioned in a corner where the plurality of features converge.

3. The computer-implemented method of claim 1, wherein at least one of the plurality of features is any one of a fillet, a weldment treatment, a chamfer, a sweep, and a loft.

4. The computer-implemented method of claim 1, wherein generating the explicit feature comprises:
   removing an area in the computer-aided design model encompassing geometry produced by the plurality of features; and
   placing geometry that gave rise to the selected one of the variations of the implicit feature into the computer-aided design model in replacement of the area removed.

5. The computer-implemented method of claim 4, wherein:
   the area removed is determined by creating a solid body that conforms to geometry produced by the plurality of features; and
   the solid body is centered at a location within the plurality of features.

6. The computer-implemented method of claim 4, wherein a shell operation is applied to the computer-aided design model prior to removing the area.

7. The computer-implemented method of claim 4, wherein placing geometry that gave rise to the selected one of the variations of the implicit feature comprises:
   sewing the geometry that gave rise to the selected one of the variations of the implicit feature into the area removed; and
   smoothing a discernable seam resulting from sewing.

8. The computer-implemented method of claim 4, further comprising:
   generating geometry for each variation of the implicit feature on a copy of the computer-aided design model; and
   removing the copy corresponding to the selected one of the variations of the implicit feature in a region surrounding the generated geometry; and wherein:
   placing geometry that gave rise to the selected one of the variations of the implicit feature comprises placing the region surrounding the generated geometry into the computer-aided design model.

9. The computer-implemented method of claim 1, further comprising:
   creating a copy of the computer-aided design model; and
   re-ordering the plurality of features in a definition of the copy of the computer-aided design model, wherein re-ordering changes an order of construction for the plurality of features in the copy of the computer-aided design model producing one of the variations of the implicit feature.

10. The computer-implemented method of claim 1, wherein presenting the variations of the implicit feature further comprises displaying each variation as a preview image within a user-interface window.

11. A computer-readable data storage medium comprising instructions for causing a computer to:
   recognize that an arrangement of a plurality of features in a computer-aided design model produce an implicit feature, the implicit feature being defined implicitly in terms of existing external features;
   present a plurality of geometric results giving rise to a plurality of variations of the implicit feature to allow for selection of one of the plurality of geometric results;
   define an explicit feature, wherein the explicit feature produces a selected one of the plurality of geometric results; and
   apply the explicit feature during construction of the computer-aided design model after application of the plurality of features, wherein to apply the explicit feature includes instructions for causing the computer to:
   remove from the computer-aided design model an area surrounding geometry giving rise to the implicit feature; and
   place into the computer-aided design model the selected one of the plurality of geometric results as a replacement of the removed area.

12. The data storage medium of claim 11, further comprising instructions for causing the computer to:
   build a plurality of copies of the computer-aided design model where each copy includes one of the plurality of geometric results giving rise to a corresponding one of the plurality of variations of the implicit feature; and
   remove a region in the copy of the computer-aided design model that includes the selected one of the plurality of geometric results, wherein the region surrounds the selected one of the plurality of geometric results.

13. The data storage medium of claim 11, wherein instructions for causing a computer to remove the area apply a six-sided body to the area surrounding geometry giving rise to the implicit feature.

14. The data storage medium of claim 13, further comprising instructions for causing a computer to apply the six-sided body using a Boolean intersection operation.

15. The data storage medium of claim 13, wherein:
each one of the plurality of features is a fillet feature; and
the implicit feature is positioned in a corner where the plurality of features converge.

16. A computer-aided design system comprising:
a processor operatively coupled to a data storage system, the data storage system storing a three-dimensional model; and
a data storage memory operatively coupled to the processor and comprising instructions to configure the processor to:
construct a plurality of model features defining the three-dimensional model;
recognize that the plurality of model features produce geometry giving rise to an implicit feature, the implicit feature being defined implicitly in terms of existing external features;
calculate variations of the implicit feature;
present geometry produced by the variations of the implicit feature to allow selection of one of the variations;
create an explicit feature that produces geometry giving rise to the selected one of the variations of the implicit feature; and
replace in the three-dimensional model geometry giving rise to the implicit feature with geometry produced by the explicit feature.

17. The computer-aided design system of claim 16, wherein instructions to configure the processor to replace the geometry further comprises instructions to:
remove from the three-dimensional model the geometry giving rise to the implicit feature; and
place the geometry produced by the explicit feature into the three-dimensional model in a region once occupied by the geometry giving rise to the implicit feature.

18. The computer-aided design system of claim 17, wherein a sewing procedure is utilized to place the geometry produced by the explicit feature.

19. The computer-aided design system of claim 17, wherein a six-sided body is applied to remove the geometry giving rise to the implicit feature.

20. The computer-aided design system of claim 16, further comprising instructions to construct the three-dimensional model by creating the geometry giving rise to the implicit feature prior to creating the explicit feature, wherein creating the explicit feature comprises instructions to produce geometry to replace the geometry giving rise to the implicit feature.

21. The computer-aided design system of claim 16, wherein:
each one of the plurality of features is a fillet feature; and
the implicit feature is positioned in a corner where the plurality of features effectively converge.

* * * * *